E. H. PAGE.
AIRSHIP.
APPLICATION FILED FEB. 19, 1915.
1,183,484.
Patented May 16, 1916.
3 SHEETS—SHEET 3.
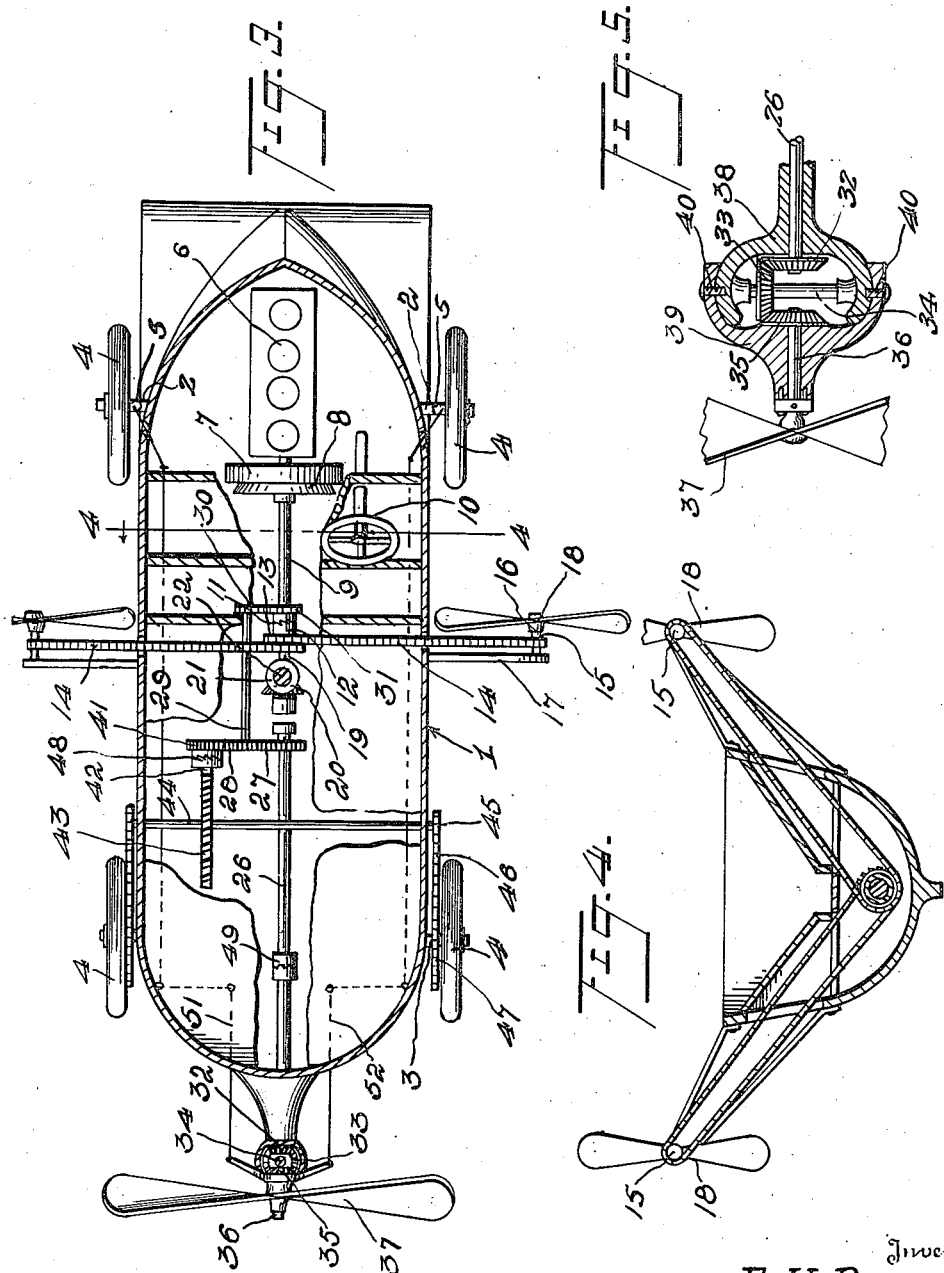

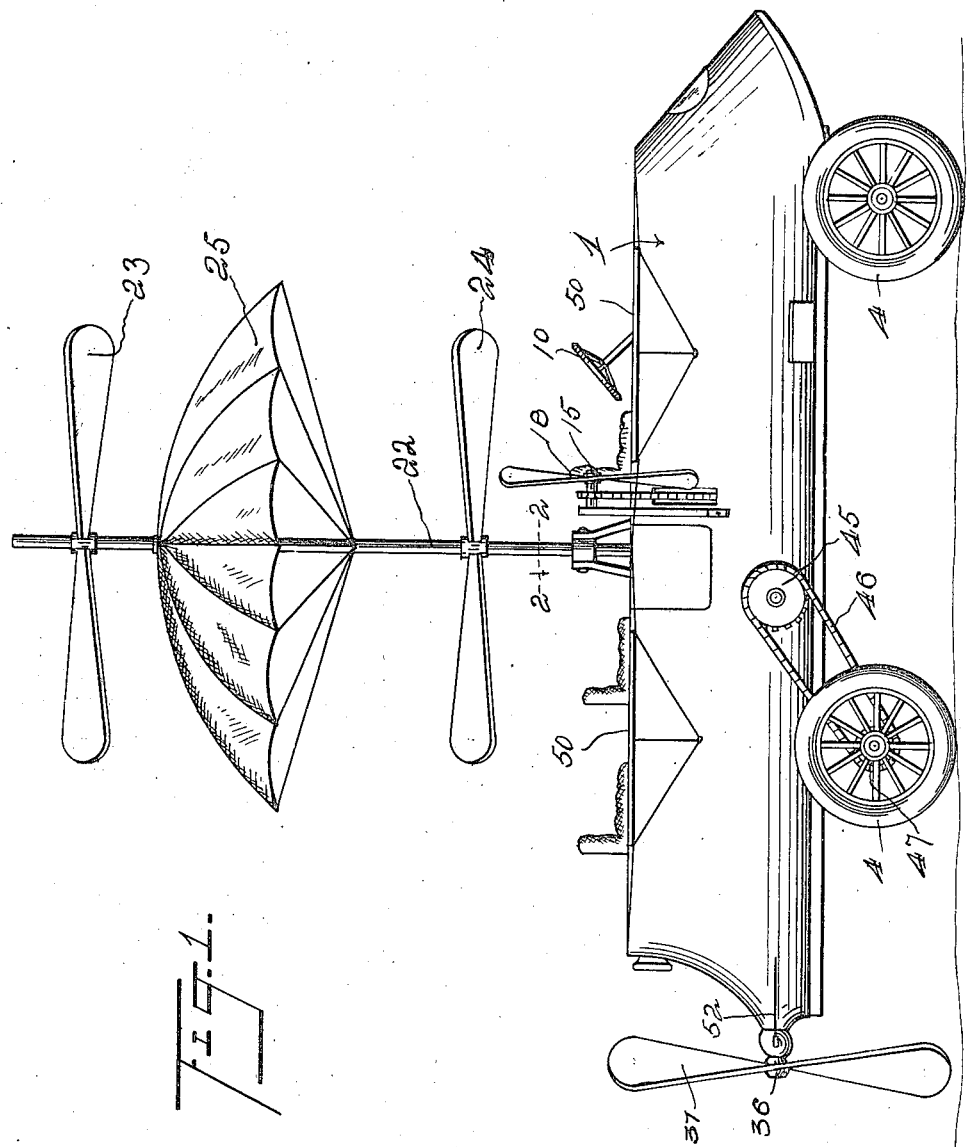

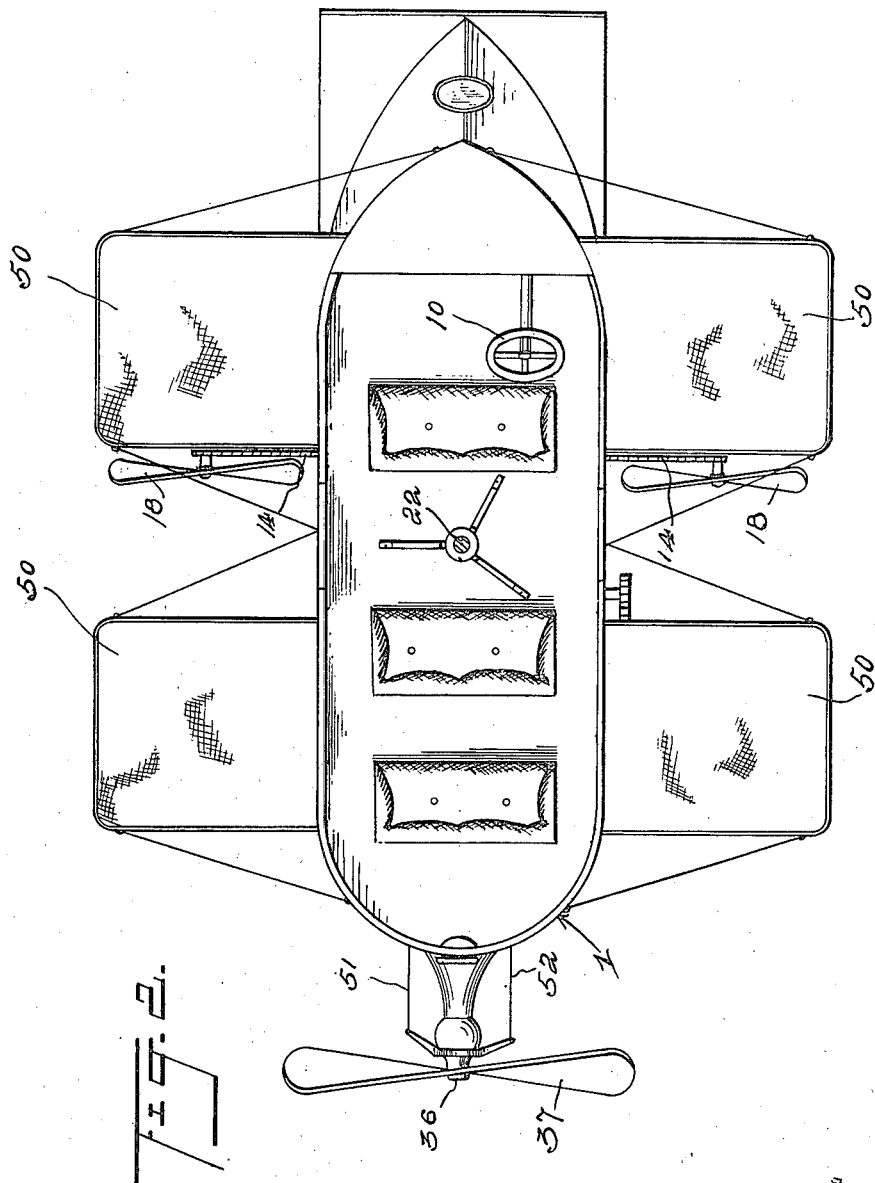

UNITED STATES PATENT OFFICE.

EDWARD HUNTER PAGE, OF COVINGTON, VIRGINIA.

AIRSHIP.

1,183,484. Specification of Letters Patent. Patented May 16, 1916.

Application filed February 19, 1915. Serial No. 9,427.

*To all whom it may concern:*

Be it known that I, EDWARD H. PAGE, a citizen of the United States, residing at Covington, in the county of Alleghany and State of Virginia, have invented certain new and useful Improvements in Airships; and I do hereby declare the following to be a full, clear, and exact description of the invention, such as will enable others skilled in the art to which it appertains to make and use the same.

This invention relates to new and useful improvements in air ships, and has for its principal object to provide a flying machine which is capable of traveling on the ground as well as in the air.

Another object of the invention is to provide a safety flying machine wherein it is practically impossible for an accident to happen to the operator which would result in serious injury.

A further object of the invention is to provide a means for retarding the fall of the device should the same become inoperative at any time.

With these and other objects in view, the invention consists in the novel combination and arrangement of parts which will be fully set forth in the following specification and accompanying drawings, in which:

Figure 1 is a side view in elevation of an air ship constructed in accordance with this invention, Fig. 2 is a top plan view thereof, Fig. 3 is a horizontal sectional view illustrating the working parts, Fig. 4 is a transverse sectional view taken on line 4—4 of Fig. 3, and Fig. 5 is an enlarged detail vertical sectional view showing the pivot for holding the steering propeller.

Referring now to the drawings by characters of reference, the numeral 1 designates as an entirety the body of the device which is preferably shaped like a boat, but which may be made in any desired form. This body is provided with the front and rear axles 2 and 3 on which the wheels 4 are mounted. The front axle is provided with the usual knuckle joint 5 so that the wheels may turn in order that the course of the device may be controlled.

In order to furnish motive power for the device, there is provided the motor 6 which is provided with the ordinary fly wheel 7, which fly wheel is constructed so as to coöperate with the clutch cone 8, which is secured to the shaft 9 and designed to drive the same. The vehicle is steered by means of the steering wheel 10 as clearly shown in Fig. 1. Secured to the end of the shaft 9 opposite the clutch cone 8 is the clutch half 11 which coöperates with the clutch half 12, which is secured to the sprockets 13 and designed to drive the same. These sprockets are connected by the chains 14 to the sprockets 15 which are secured to the stub shafts 16, which are mounted in the brackets 17, which in turn are supported by the body 1. These stub shafts are provided with suitable propellers 18 which are used to drive the machine forward. A suitable shaft 19 is connected to the sprockets 13 and carries the beveled gear 20 which meshes with the beveled gear 21 and is designed to drive the shaft 22, which shaft extends upwardly from the center of the vehicle and is provided at its upper terminal with a suitable propeller 23 and intermediate its ends with the propeller 24, which propellers are designed to coöperate in causing the machine to rise. Supported on the shaft 22 intermediate the propellers 23 and 24 is the parachute 25 which is designed to assist in supporting the device in the air and also to retard the fall of the device should the same meet with an accident.

In order to steer the device, there is provided the shaft 26 which carries at one end the spur gear 27, which in turn meshes with the gear 28, mounted on the shaft 29, which shaft is driven by the gear 30 meshing with the gear 31, which in turn is driven by the shaft 9. The shaft 26 is provided at the end opposite the spur gear 27 with the beveled gear 32 which meshes with the beveled gear 33, which in turn is mounted on the vertical shaft 34 and meshes with the beveled gear 35 which is mounted on the stub shaft 36 on which the propeller 37 is secured. These shafts are supported in the respective housings 38 and 39, which housings are pivoted together as at 40 and are designed to protect the gearing from the elements.

In order that the vehicle may travel on the ground there is provided the spur gear 41 which is secured to the shaft 42 and meshes with the gear 28 as clearly shown in Fig. 3. This shaft 42 is provided with a suitable worm which meshes with the worm wheel 43, which wheel is mounted on the shaft 44, which shaft is rotatable transversely of the vehicle and is provided at each end with suitable sprockets 45 over which the chain 46 passes and is arranged to be driven thereby. This chain also passes over the sprocket 47 which is secured to its respective drive wheel, and it will be clearly seen that when the shaft 44 is rotated the wheels will be set in motion, thereby causing the vehicle to travel on the ground. In order to control the rotation of these wheels there is provided the clutch 48 which is operatively mounted on the shaft 42 and designed to control the rotation of the same. A similar clutch 49 is interposed intermediate the ends of the shaft 26 and this clutch is designed to control the operation of the propeller 37.

In order to help maintain the device in the air there are provided the wings 50 which extend laterally from the body of the device and materially assist in the supporting thereof when the device is flying.

It will be apparent from the foregoing that in use when the operator desires to rise, the clutch half 11 is thrown in so as to engage the clutch half 12 which will cause the shaft 22 to revolve and thereby operate the propellers 23 and 24. As soon as these propellers start to take effect, it will be evident that the machine will rise from the ground and after the desired height has been obtained the propellers 18 are set in operation which will cause the machine to fly horizontally. Should it be desired to turn, it will be apparent that by pulling on either one of the cords 51 or 52, which may be secured to any suitable steering mechanism, the steering propeller 37 will be swung to one side or the other and thereby cause the machine to take the desired course.

When the user desires to descend, the parachute 25 is made use of as it will retard the fall of the machine, and upon reaching the ground the user then operates the clutch 48 so that the shaft 42 will be driven, which in turn will drive the worm 43 and rotate the shaft 44 which will cause the rear wheels 4 to revolve and in this way the user may drive across country if desired without using the flying apparatus of the machine.

While in the foregoing there has been shown and described the preferred embodiment of this invention, it is to be understood that such changes may be made in the combination and arrangement of parts as will fall within the spirit and scope of the invention as defined in the appended claim.

What is claimed is:

An air ship of the character described comprising a body, a motor within the body, a drive shaft extending longitudinally of the body, a clutch connecting the drive shaft with the motor, a spur gear mounted on the drive shaft near the clutch, a counter-shaft extending parallel with the drive shaft, a spur gear on the counter-shaft and meshing with the first named spur gear, a spur gear mounted on the opposite end of the counter-shaft, a rear propeller shaft mounted in parallel relation with the counter-shaft and in direct alinement with the drive shaft, a propeller on said shaft, a spur gear carried by the forward end of the propeller shaft meshing with the last named gear on the counter-shaft, a clutch intermediate the ends of the propeller shaft and arranged to control the operation of the propeller, means to permit the propeller to swing in order to steer the device, a stub shaft interposed between the drive shaft and the rear shaft and in parallel relation with the counter-shaft, a clutch connecting the drive shaft with the stub shaft, a vertical shaft mounted directly above the stub shaft, helicopters mounted on the vertical shaft, means to drive the vertical shaft from the stub shaft, sprockets mounted on the stub shaft, brackets extending laterally from the body, stub shafts mounted in the brackets, propellers carried by the stub shafts, and sprockets on said stub shafts, chains connecting the last named sprockets with the first named sprockets, a second counter-shaft extending longitudinally of the machine and spaced laterally from the first mentioned counter shaft, a spur gear meshing with the second mentioned spur gear on the first named counter-shaft, a worm carried by the second mentioned counter-shaft, a clutch controlling the operation of the second mentioned counter-shaft, a transversely extending drive shaft, a worm wheel carried by the transversely extending drive shaft and engaging the worm, and sprockets secured to the ends of the drive shaft and designed to drive the rear wheels of the vehicle when the device is being used on the ground.

In testimony whereof I affix my signature in presence of two witnesses.

EDWARD HUNTER PAGE.

Witnesses:
 ADDISON KINCADE,
 LORY MOATS.